United States Patent [19]

Dorsch

[11] Patent Number: 4,785,630
[45] Date of Patent: Nov. 22, 1988

[54] ARRANGEMENT FOR THE CONTROL OF THE CHARGING PRESSURE OF AN EXHAUST GAS TURBOCHARGER

[75] Inventor: Heinz Dorsch, Weissach, Fed. Rep. of Germany

[73] Assignee: Dr. Ing. h.c.F. Porsche Aktiengesellschaft, Stuttgart, Fed. Rep. of Germany

[21] Appl. No.: 66,535

[22] Filed: Jun. 26, 1987

[30] Foreign Application Priority Data

Jun. 27, 1986 [DE] Fed. Rep. of Germany ....... 3621641

[51] Int. Cl.⁴ .............................................. F02B 37/12
[52] U.S. Cl. ........................................................ 60/602
[58] Field of Search .................. 60/600, 601, 602, 603

[56] References Cited

U.S. PATENT DOCUMENTS

| | | | |
|---|---|---|---|
| 4,235,076 | 11/1980 | Meloche et al. | 60/602 |
| 4,461,149 | 7/1984 | Suzuki | 60/602 |
| 4,463,565 | 8/1984 | Rydquist et al. | 60/602 |
| 4,467,607 | 8/1984 | Rydquist et al. | 60/602 |
| 4,646,522 | 3/1987 | Mamiya et al. | 60/602 |

FOREIGN PATENT DOCUMENTS

| | | | |
|---|---|---|---|
| 108413 | 7/1982 | Japan | 60/602 |
| 144627 | 8/1983 | Japan | 60/602 |
| 29728 | 2/1984 | Japan | 60/602 |
| 249618 | 12/1985 | Japan . | |

*Primary Examiner*—Michael Koczo
*Attorney, Agent, or Firm*—Barnes & Thornburg

[57] ABSTRACT

An arrangement for controlling the charging pressure of an exhaust gas turbocharger in which the turbine driving the compressor is adapted to be regulated by means of a by-pass valve that is acted upon with control pressure by an electromagnetic timing valve. The timed cycle duration variable by a control apparatus in dependence on the deviation from the desired charging pressure of the internal combustion engine. For reasons of operating safety, two control lines with slightly different pressure levels and each consisting of a control apparatus, of a timing valve and of a control pressure line are connected with a shifting valve, from which a common control pressure line leads to the by-pass valve.

11 Claims, 2 Drawing Sheets

ARRANGEMENT FOR THE CONTROL OF THE CHARGING PRESSURE OF AN EXHAUST GAS TURBOCHARGER

BACKGROUND AND SUMMARY OF THE INVENTION

The invention relates to an arrangement for the regulation of the charging pressure of an exhaust gas turbocharger consisting of a turbine and compressor of an internal combustion engine in which the exhaust gas stream coming from the internal combustion engine is adapted to be selectively conducted to the turbine or by way of a by-pass line having a by-pass valve around the turbine to the exhaust gas system, and in which the by-pass valve is adapted to be acted upon with control pressure by an electromagnetic timing valve which is connected both to the pressure side and also to the suction side of the compressor and whose timed cycle duration is variable by a control apparatus in dependence on the deviation of the measured charging pressure from the desired charging pressure stored in the control apparatus.

Such an arrangement is disclosed in the DE-OS No. 32 05 009. The turbine of an exhaust gas turbocharger is acted upon with the exhaust gas stream coming from the internal combustion engine; the turbine, in its turn, drives a compressor for supplying charging air for the cylinders. A by-pass valve is inserted into an exhaust gas by-pass line whereby the exhaust gas flow is adapted to be conducted entirely or partly around the turbine directly into the exhaust gas system by opening the by-pass valve. The passage opening of the by-pass valve is controllable by a valve body secured at a diaphragm. The diaphragm is spring-loaded on one side by a spring and is acted upon on the other side with the control pressure which is supplied by an electro-magnetic timing valve. Charging pressure of the charging air supplied by the compressor is present on the one side of the timing valve and the atmospheric pressure of the air entering the compressor is present on the other side thereof.

The control pressure results from mixing charging pressure and atmospheric pressure. With zero opening of the timing valve, the control pressure is equal to the charging pressure whereas with full opening, the control pressure is equal to the atmospheric pressure. The opening and closing time ratio of the timing valve operating, for example, at 15 Hz between the open and closed condition is varied by an electronic control apparatus, by means of which the cyclic opening and closing time of the timing valve is varied in dependence on the signals for the charging pressure, for the rotational speed and for the throttle valve position of the internal combustion engine at the input of the control apparatus.

It is the object of the present invention to so further develop a control arrangement of this type that its operating reliability is increased.

The underlying problems are solved according to the present invention in that two control lines are provided each consisting of a timing valve, of a control apparatus and of a control pressure line which are adapted to be activated for controlling the by-pass valve. If two control lines each consisting of a timing valve and of a control apparatus are provided which are both connected to the by-pass valve, a redundant control system is created which increases the operating reliability. In case of failure of the one control line which is just in operation, the other can take over its function. In order to avoid that both control lines operate in common, as a result of which undesired overlap effects or control oscillations could occur, the pressure level at which the two control lines respond, are slightly different. During normal operation, only the one control line operates which is designed for the higher control pressure level. This is achieved in an advantageous construction according to the present invention in that both timing valves are connected by way of separate pneumatic control pressure lines with a switching valve, from which a common control pressure line leads to the by-pass valve. The valve body of the switching valve is so displaced by the higher pressure in the control pressure line of the control system, in which the desired charging pressure is reached, that it closes the other control pressure line, as a result of which the control line coordinated thereto becomes ineffective.

A differing control pressure level can be achieved in that either the desired charging pressure stored in the control apparatus or the actual charging pressure fed to the control apparatus by pressure sensors is different.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
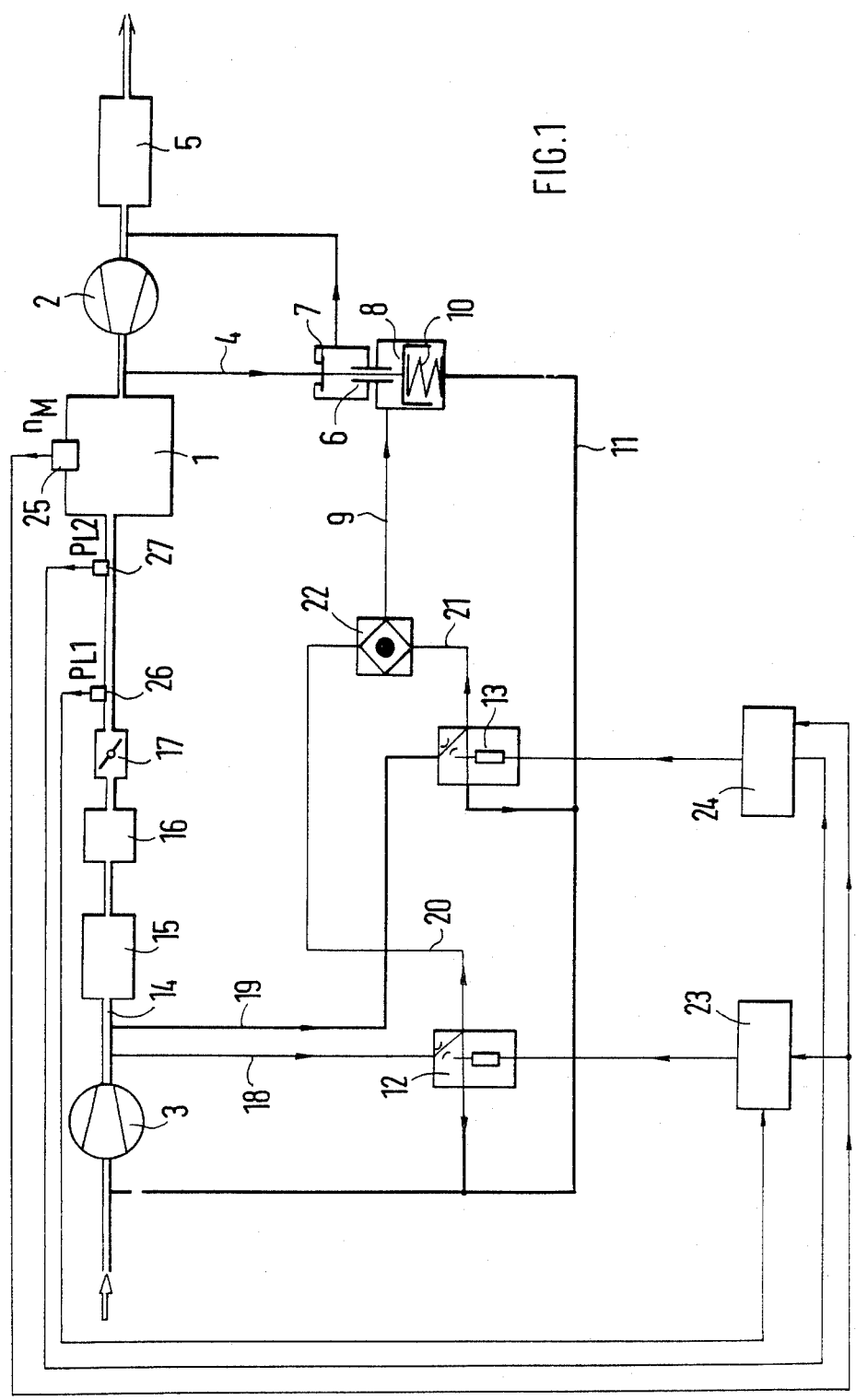
FIG. 1 is a schematic view of one embodiment of a control arrangement in accordance with the present invention.

Referring now to the drawing wherein like reference numerals are used throughout the two views to designate like parts, a turbine 2 is acted upon with the exhaust gas flowing out of an internal combustion engine 1; the turbine 2 together with a compressor 3 driven by the turbine 2 forms an exhaust gas turbocharger. A by-pass line 4 branches off upstream of the turbine 2 which terminates downstream of the turbine 2 in the exhaust gas system upstream of a noise silencer or muffler 5. The volumetric flow of the by-pass line is controlled by a by-pass valve 6 installed into the same. For that purpose, a valve body 7 of the by-pass valve 6 is connected with a diaphragm 8 which is acted upon at its top side with the control pressure coming from the one control pressure line 9 whereas it is acted upon at its bottom side by a spring 10 and is connected with an atmospheric pressure line 11. Two branch lines also lead from this atmospheric pressure line 11 which is connected to the suction side of the compressor 3, to a first electromagnetic timing valve 12 and to a second electromagnetic timing valve 13.

A charging air line 14 leading to an internal combustion engine 1 starts from the pressure side of the compressor 3, in which a charging air cooler 15, an air quantity measuring device 16 and a throttle valve 17 are series-connected in this sequence. A charging pressure line 18 branches off between the compressor 3 and the charging air cooler 15 to the first timing valve 12 and a charging pressure line 19 to the second timing valve 13. In the timing valves 12 and 13, the charging pressure is mixed with atmospheric pressure for the formation of the control pressure. A control pressure line 20 leads from the one timing valve 12 to a shifting valve 22 and a control pressure line 21 leads from the other timing valve 13 also to the shifting valve 22 which is connected by means of a common control pressure line 9 to the top side of the diaphragm 8 of the by-pass valve 6.

The timing valves 12 and 13 which are of any conventional known construction have an opening-closing frequency of about 10 to 300 Hz. The timed cycle duration is determined by two control apparatuses 23 and 24 of which a respective one is coordinated to a timing valve 12 and 13 and is connected therewith by an electric line. De-energized, the timing valves 12 and 13 are closed. In the closed condition, the timing valves 12 and 13 produce a control pressure which is equal to the charging pressure whereas at 100% opening the produced control pressure is equal to the atmospheric air pressure.

Signals for the values of the rotational speed of the internal combustion engine as well as for the charging pressure which are detected by means of sensors 25, 26 and 27, are fed to the inputs of the control apparatus 23 and 24 whereby the charging pressures PL1 and PL2 for each control apparatus 23 and 24 are detected separately by a pressure sensor 26, respectively, 27. The one pressure sensor 26 is arranged directly downstream of the throttle valve 17 whereas the other pressure sensor 27 is arranged further downstream and feeds a charging pressure PL2 lower by about 0.05 bar to the associated control apparatus 24. The control pressure produced by the timing valve 13 is also correspondingly slightly lower than the control pressure of the other timing valve 12. The switching valve 12 is so shifted by the higher pressure in the control pressure line 20 that the other control pressure line 21 is closed.

Figure 2:
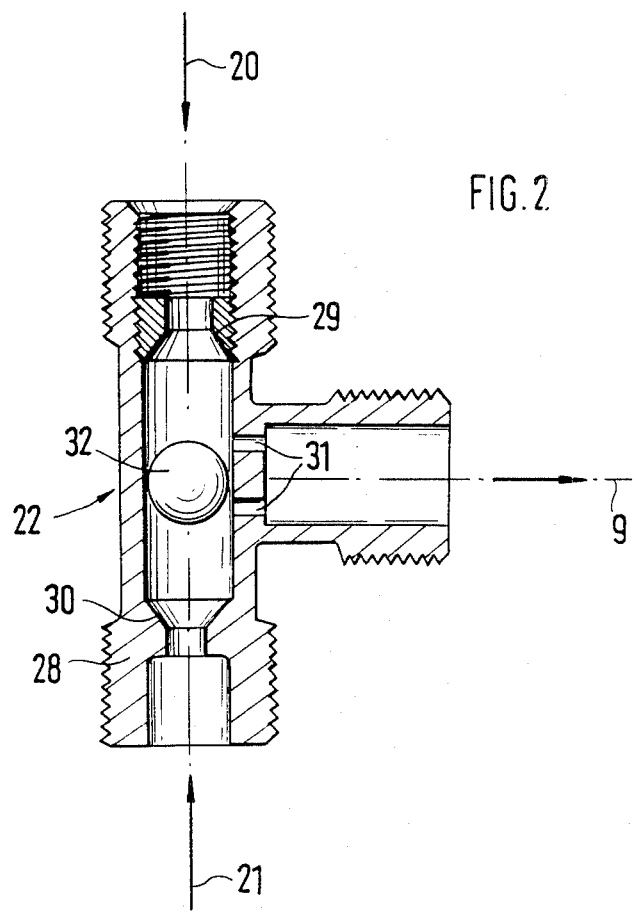
FIG. 2 is a cross-sectional view through a switching valve in accordance with the present invention for use in the control system illustrated in FIG. 1.

The constructive realization of the switching valve 22 is illustrated in FIG. 2. A T-member 28 serving as housing is connected by means of coaxial inflow openings which contain valve seats 29 and 30, to the control pressure line 20 and to the control pressure line 21. Outlet openings 31 which are disposed at right angle thereto, are connected with the control pressure line 9 to the by-pass valve 4. A valve ball 32 which is longitudinally guided between the valve seats 29 and 30 in the T-member 28 abuts either at the one or the other valve seat dependent on the pressure level on both sides thereof and therewith renders the control connection connected therewith ineffectual.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. An arrangement for the regulation of the charging pressure of an exhaust gas turbocharger of an internal combustion engine in which the exhaust gas turbocharger includes a turbine and a compressor, comprising further means for selectively conducting exhaust gas flow coming from the internal combustion engine either to the turbine or by way of a by-pass line means having a by-pass valve means around the turbine into an exhaust gas system, electro-magnetic timing valve means, the by-pass valve means being acted upon with a control pressure by said electro-magnetic timing valve means operatively connected to the pressure side and the suction side of the compressor, a control apparatus means for varying a cyclic duration of the electro-magnetic timing valve as a function of the deviation of a measured charging pressure from a desired charging pressure stored in the control apparatus means, and further control means including two control line means each connected to said electro-magnetic timing valve means and the pressure side of the compressor and actuated by a control apparatus means, a control pressure line which is operable to be activated by the electro-magnetic timing valve means for the control of the by-pass valve means, and wherein one control line means is responsive to a higher charging pressure level than the other control line means.

2. An arrangement according to claim 1, further comprising two pressure sensor means measuring the charging pressure level, said two pressure sensor means being arranged at different places along the charging air line extending from the compressor to the internal combustion engine.

3. An arrangement according to claim 1, wherein there are two electro-magnetic timing valve means and both are connected by way of separate control pressure lines to a shifting valve means and from the latter by way of said control pressure line with the by-pass valve means.

4. An arrangement according to claim 3, wherein the control line means having the lower desired charging pressure and acted upon correspondingly with higher control pressure closes the other control line means by actuation of the shifting valve means and thus renders the other control line means ineffective for the control of the by-pass valve means.

5. An arrangement according to claim 3, wherein the control pressure line acted upon with the higher charging pressure and control pressure closes the other control pressure line by actuation of the shifting valve means.

6. An arrangement according to claim 5, wherein the shifting valve means includes a T-member having two coaxial valve seats and an outlet opening disposed substantially perpendicular thereto, the two valve seats being in operative connection with the control pressure lines and being alternately operable to be closed by a valve ball.

7. An arrangement for the regulation of the charging pressure of an exhaust gas turbocharger of an internal combustion engine in which the exhaust gas turbocharger includes a turbine and a compressor, comprising further means for selectively conducting exhaust gas flow control from the internal combustion engine either to the turbine or by way of a by-pass line means having a by-pass valve means around the turbine into an exhaust gas system, electro-magnetic timing valve means, the by-pass valve means being acted upon with a control pressure by said electro-magnetic timing valve means operatively connected to the pressure side and the suction side of the compressor, a control apparatus means for varying a cyclic duration of the electro-magnetic timing valve as a function of the deviation of a measured charging pressure from a desired charging pressure stored in the control apparatus means, and further control means including two control line means each connected to said electro-magnetic timing valve means and the pressure side of the compressor and actuated by a control apparatus means, a control pressure line which is operable to be activated by the electro-magnetic timing valve means for the control of the by-pass valve means, and further comprising two pressure sensor means measuring the charging pressure level, said two pressure sensor means being arranged at different places along the charging air line extending from the compressor to the internal combustion engine.

8. An arrangement for the regulation of the charging pressure of an exhaust gas turbocharger of an internal combustion engine in which the exhaust gas turbocharger includes a turbine and a compressor, comprising further means for selectively conducting exhaust gas flow coming from the internal combustion engine either to the turbine or by way of a by-pass line means having a by-pass valve means around the turbine into an exhaust gas system, electro-magnetic timing valve means, the by-pass valve means being acted upon with a control pressure by said electro-magnetic timing valve means operatively connected to the pressure side and the suction side of the compressor, a control apparatus means for varying a cyclic duration of the electro-magnetic timing valve as a function of the deviation of a measured charging pressure from a desired charging pressure stored in the control apparatus means, and further control means including two control line means each connected to said electro-magnetic timing valve means and the pressure side of the compressor and actuated by a control apparatus means, a control pressure line which is operable to be activated by the electro-magnetic timing valve means for the control of the by-pass valve means, and wherein there are two electormagnetic timing valve means and both are connected by way of separate control pressure lines to a shifting valve means and from the latter by way of a common control pressure line with the by-pass valve means.

9. An arrangement according to claim 8, wherein the control line means having the lower desired charging pressure and acted upon correspondingly with higher control pressure closes the other control line means by actuation of the shifting valve means and thus renders the other control line means ineffective for the control of the by-pass valve means.

10. An arrangement according to claim 8, wherein the control pressure line acted upon with the higher charging pressure and control pressure closes the other control pressure line by actuation of the shifting valve means.

11. An arrangement according to claim 8, wherein the shifting valve means includes a T-member having two coaxial valve seats and an outlet opening disposed substantially perpendicular thereto, the two valve seats being in operative connection with the control pressure lines and being alternately operable to be closed by a valve ball.

* * * * *